May 11, 1954
L. C. McQUIEN
2,677,912
AUTOMATIC SELF-RESETTING RODENT TRAP
Filed March 16, 1951
2 Sheets-Sheet 1
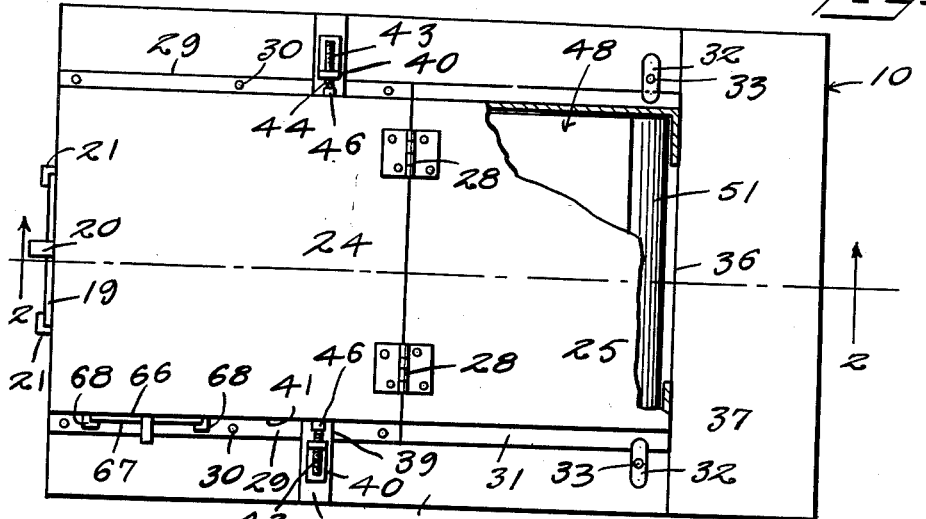
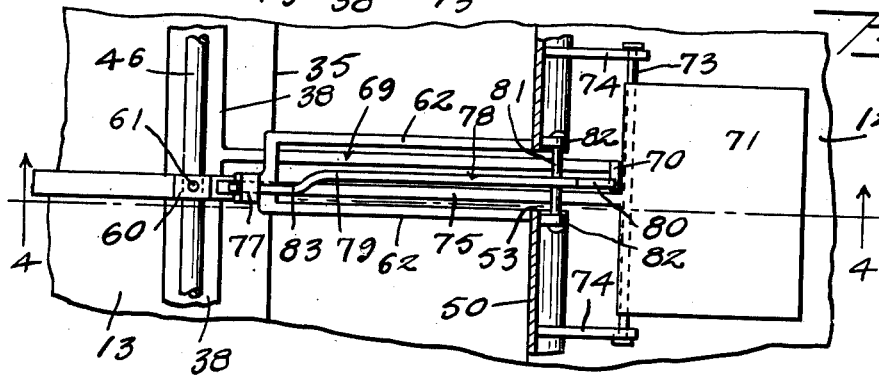
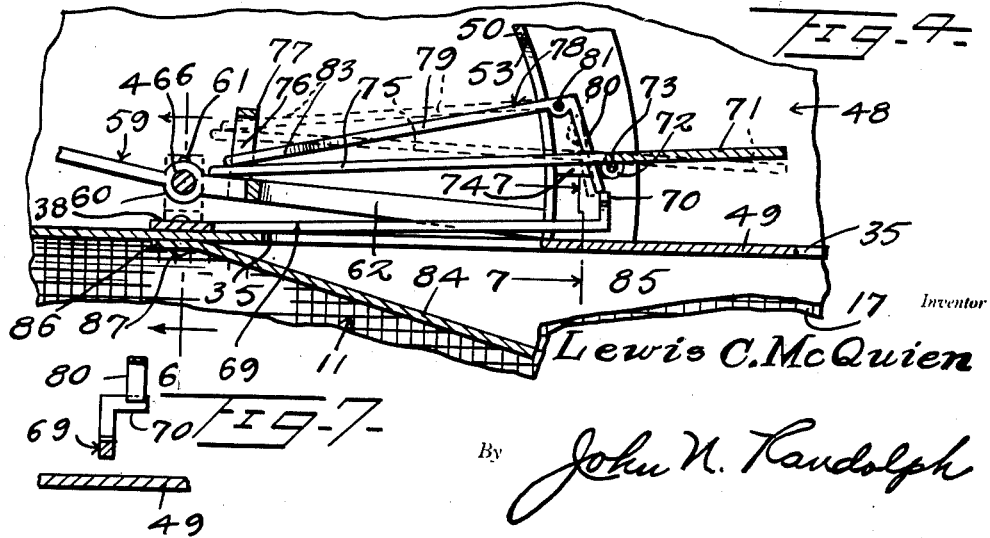
Inventor
Lewis C. McQuien
By John N. Randolph
Attorney May 11, 1954  L. C. McQUIEN  2,677,912
AUTOMATIC SELF-RESETTING RODENT TRAP
Filed March 16, 1951  2 Sheets-Sheet 2
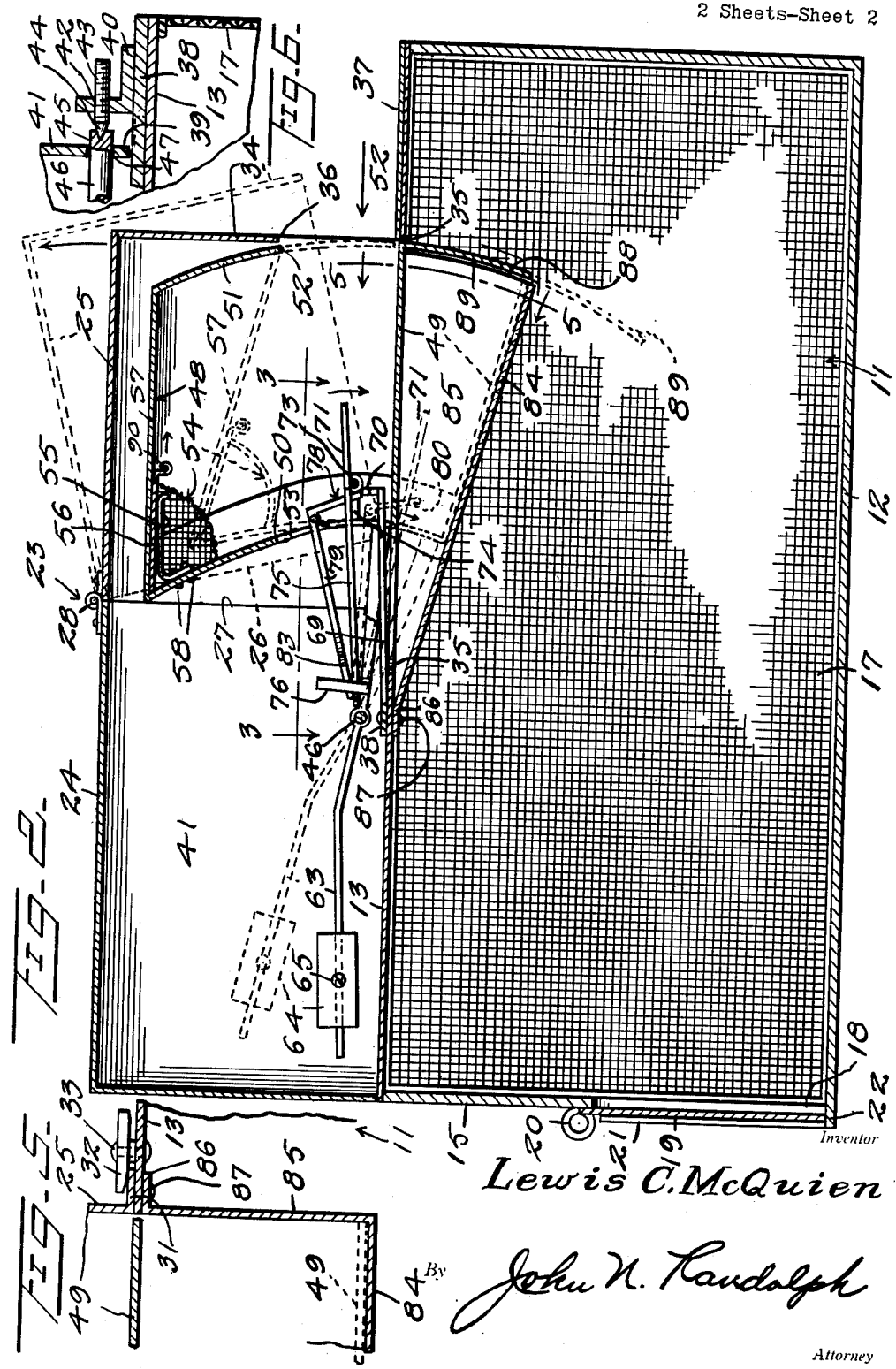
Inventor
Lewis C. McQuien
By John N. Randolph
Attorney Patented May 11, 1954

2,677,912

UNITED STATES PATENT OFFICE 2,677,912

AUTOMATIC SELF-RESETTING RODENT TRAP

Lewis C. McQuien, McKenzie, Ala.

Application March 16, 1951, Serial No. 215,997

3 Claims. (Cl. 43—70)

This invention relates to a rodent trap of relatively simple construction which is actuated by the weight of a rodent for entrapping a rodent without injury and for automatically resetting itself whereby any number of rodents may be entrapped before removal of the entrapped rodents.

Another object of the invention is to provide a novel latch means for normally maintaining the trap in a set position which is actuated by a rodent entering the trap and attempting to reach the bait contained therein for closing the trap and discharging the rodent into a separate compartment of the trap and which thereafter automatically returns to a set position after the removal of the weight of the rodent from the entrapping mechanism.

A further object of the invention is to provide a trap capable of being very durably constructed which will effectively function for an indefinite period of time to efficiently accomplish its intended result.

Various other objects and advantages of the invention will hereinafter become more fully apparent from the following description of the drawings, illustrating a presently preferred embodiment thereof, and wherein:

Figure 1 is a plan view, partly in section of the invention;

Figure 2 is an enlarged longitudinal vertical sectional view taken substantially along a plane as indicated by the line 2—2 of Figure 1;

Figure 3 is a fragmentary horizontal sectional view, on an enlarged scale, taken substantially along a plane as indicated by the line 3—3 of Figure 2;

Figure 4 is a longitudinal vertical sectional view taken substantially along a plane as indicated by the line 4—4 of Figure 3;

Figure 5 is a transverse sectional view taken substantially along a plane as indicated by the line 5—5 of Figure 2 and on an enlarged scale, and Figure 6 and 7 are enlarged fragmentary transverse sectional views taken substantially along planes as indicated by the lines 6—6 and 7—7, respectively, of Figure 4.

Referring more specifically to the drawings, the automatic resetting trap in its entirety is designated generally 10 and includes an elongated box-like bottom section, designated generally 11, in which entrapped rodents are retained without injury until removed from the trap. Said bottom section 11 preferably includes a bottom wall 12, top wall 13 and end walls 14 and 15 of solid construction which may be formed of any relatively thin sheet like material of sufficient strength, such as sheet metal or plywood. The two corresponding side walls 17 of the bottom container section 11 are preferably formed of mesh wire fabric of sufficient strength to prevent rodents from escaping therethrough by tearing holes in the mesh wire fabric side walls. However, if desired the side walls 17 of the section 11 may be formed of a material corresponding to the other wall portions of said section. The end wall 15 is provided with an exit opening 18 which is normally closed by a sliding closure 19 having a handle 20 at its upper end. The closure 19 is slidably supported against the outer side of the end wall 15 by oppositely disposed guides 21 which are secured to the outer side of the wall 15, on either side of the opening 18 and each of which is provided with an outwardly offset inwardly extending flange which overlies a side edge portion of the closure 19, as best illustrated in Figure 1. As seen in Figure 2, the bottom 12 has a portion 22 extending outwardly between the guides 21 beyond the outer surface of the end wall 15 for supporting the lower end of the closure 19 in its closed position of Figure 2.

A housing, designated generally 23, constituting the top section of the trap 10 is supported on the top wall 13 of the bottom section 11 and includes a stationary section 24 which extends from above the end wall 15 to a point intermediate of the ends of the section 11. The other, swingable section 25 of the housing 24 has an inner open end 26 abutting the inner, open end 27 of the housing section 24 when the housing is in a closed position. The housing sections 24 and 25 are connected at their open ends 27 and 26, respectively, by hinges 28 which are secured to the top walls of the sections 24 and 25 whereby the housing section 25 may be swung upwardly and away from the container top wall 13 on the hinges 28 from its closed full line position of Figure 2 to and beyond its partially open dotted line position of Figure 2. The side walls of the housing section 24 are provided with outturned flanges 29 at their bottom edges which rest upon the container top wall 13 and are secured thereto by fastenings 30, as seen in Figure 1. The side walls of the housing section 25 are provided with outturned flanges 31 at their bottom edges which rest upon the top wall 13, when the housing is in a closed position. A pair of turn buttons 32 is swivally mounted each by fastenings 33 above the top wall 13. The turn buttons 32 are disposed to engage over or be disengaged from the flanges 31 for releasably retaining the housing section 25 in a closed position.

The opposite end of the housing 23, defined by the outer end wall 34 of the housing section 25, terminates inwardly of and spaced from the end wall 14 of the section 11. The top wall 13 is provided with an elongated opening 35 which extends from just beyond the housing end wall 34 to a point inwardly of the open end 27 of the housing section 24. The opening 35 is of substantially the same width as the internal width of the housing 23. The housing end wall 34 terminates substantially above the level of the bottom edges of the side walls of the housing section 25, as defined by the flanges 31 so that when the housing section 25 is in its full line, closed position of Figure 2, the space between the bottom edge of its end wall 34 and the top wall 13 of the bottom section 11 will define an entrance opening 36 constituting the only opening to the interior of the housing 23. If the top wall 13 is formed of a material other than metal, a sheet metal plate 37 is preferably secured in any suitable manner to the portion thereof disposed between the end wall 14 and the opening 35.

A bar 38 extends transversely across the top wall 13 through the housing section 24, adjacent its open end 27 and through notches in the side walls of the housing section 24 and in its flanges 29, as seen at 39 in Figure 6. The bar 38 may be secured to the top wall 13 in any suitable manner. The bar 38 supports a pair of angle members 40, one of which is disposed adjacent each end thereof and beyond the side walls 41 of the housing section 24. Each angle member 40 has an upstanding portion provided with a threaded opening 42 for receiving a journal element 43 which is threaded inwardly therethrough and which is provided with a conical shaped inner end 44 which engages in a conical recess 45 of a shaft 46. The shaft 46 extends loosely through openings 47 in the housing walls 41 and is provided with a recess 45 at each end thereof by means of which said shaft is journaled at its ends by the bearing portions 44.

An entrapping housing, designated generally 48, is swingably disposed in the housing section 25 for vertical swinging movement through the opening 35 and includes a floor portion 49 which is normally disposed in and fills a portion of the opening 35 from adjacent the plate 37. The entrapping housing 48 includes inner and outer end walls 50 and 51, respectively, which are arced in the same direction, as clearly illustrated in Figure 2. The outer end wall 50 is provided with an entrance opening 52 which registers with the entrance opening 36 when the floor 49 is disposed in the plane of the top wall 13, as seen in Figure 2. The entrapment housing 48 is otherwise closed except for a restricted opening 53 in its rear wall 50. A bait container 54 having bottom and side portions formed of mesh wire fabric is removably disposed at the upper inner end of the housing 48 and is adapted to contain a rodent bait, not shown. The bait container 54 may be detachably mounted in any suitable manner as by a leaf spring 55 which bears against a solid top wall 56 of the container 54 to clamp said wall 56 against the top wall 57 of the housing 48. One end of the retaining spring 55 is turned downwardly and secured by fastenings 58 to the inner end wall 50. Accordingly, the bait container can be slid from left to right out of engagement with the retaining spring 55 sufficiently so that bait can be inserted into the open side of the container 54 which normally is closed by a portion of the inner wall 50.

As best seen in Figures 2, 3 and 4, a balance beam 59 has a transverse opening 60 intermediate of its ends which engages the intermediate portion of the shaft 46 and which is secured thereto by a setscrew 61. Said beam 59 is provided with a bifurcated end 62 the terminals of the furcations of which are formed integral with or suitably secured to the inner housing wall 50 adjacent the floor 49, one on either side of the opening 53. The other end 63 of the balance beam 59 extends toward the outer closed end of the housing section 24 and has a counterweight 64 adjustably secured thereto by a setscrew 65. The setscrew 65 preferably faces toward one side wall 41 and said side wall is provided with an opening 66 affording access to the screw 65 and weight 64 for adjustably positioning the weight on the balance beam end 63. The opening 66 is normally closed by a closure 67 mounted in guides 68 on the outer side of said wall 41, which closure and guides may be of the same construction as the closure 19 and guides 21. The weight 64 is disposed so that it will counterbalance the weight of the entrapment housing 48 and normally maintain said housing in its full line position of Figure 2.

A stationary keeper 69, as best seen in Figures 3 and 4, comprises a bar which is preferably formed integral with the intermediate portion of the bar 38 and which extends transversely therefrom toward the housing 48 through its opening 53. The keeper 69 is provided with an upwardly offset laterally extending free end 70 which is disposed in the entrapment housing 48.

A treadle plate 71 has an inner edge forming a sleeve 72 which engages around a pin 73. The ends of the pin 73 are journaled in bearings 74 which are secured to and project from the inner side of the housing wall 50 and which straddle the opening 53 thereof. The portions 72 and 73 are spaced outwardly from the keeper portion 70 for downward swinging movement on the outer side thereof. A bar 75 which is laterally offset from the keeper portion 70 extends from the inner edge of the treadle 71 through the opening 53 and has a free end which is disposed over the bifurcated portion 62 adjacent the shaft 46. Said free end of the bar 75, which is formed integral with the treadle 71, is disposed between upstanding guide portions 76 which are fixed to and rise from the shank of the bifurcated portion 62 and which are connected at their upper ends by a crosshead 77 forming a stop for limiting upward swinging movement of the treadle bar 75 and downward swinging movement of the treadle 71.

A latch bar, designated generally 78, includes a long bar portion 79 and a shorter bar portion 80 which is disposed substantially at a right angle to the bar portion 79. A pin 81 extends through the bar portion 79 adjacent the apex of the portions 79 and 80 and said pin is journaled at its ends in a pair of ears 82 which are fixed to and project from the inner side of the housing wall 50 on either side of and adjacent the opening 53 and above the bearings 74. The pin 81 is disposed closer to the wall 50 than the pin 73 and each of said pins is provided with headed ends for retaining said pins in engagement with the bearings 74 and ears 82. One headed end of each pin may be formed theron by flattening the pin end after the pin is applied. The longer latch bar portion 79 is provided with a laterally offset free end 83 which overlies the free end of the treadle bar 75 and is also disposed in the guides 76 below the stop 77. The other latch bar end 80 extends downwardly on one side of the treadle bar 75 and has its free end normally disposed to engage on the keeper portion 70 and is normally held in this its full line position of Figure 4 by the weight of the bar portion 79, as illustrated in Figures 2, 3, 4 and 7.

A combination shield and stop comprising a plate 84 is disposed in the bottom section 11 beneath the opening 35 and at an angle to the top wall 13. Said plate 84 has upstanding side walls 85 provided with outturned flanges 86, as seen in Figure 5, secured by fastenings 87 to the underside of the top wall 13. One end of the plate 84 is secured by additional fastenings 87 to the underside of the top wall 13 beneath the bar 38 and said bar may be secured to the wall 13 by the same fastenings. The plate 84 is inclined downwardly and away from said last mentioned end and its opposite free end is spaced a sufficient distance below the top wall 13 so that said end of the plate 84 and the adjacent ends of the side walls 85 form an opening 88 through which a rodent may enter the section 11 from the entrapment chamber 48 when said chamber or housing 48 is in its dotted line position of Figure 2. The floor 49, beneath the opening 52, is provided with a depending apron 89 which is disposed concentric with the wall 51 on an arc having the shaft 46 as a center. The apron closes the opening 88 of the shield 84 when the floor 49 is in its elevated full line position of Figure 2 to prevent a rodent getting under the floor 49 so as to prevent the entrapment chamber or housing 48 from swinging downwardly to its dotted line rodent discharging position.

Assuming that the container 54 contains a bait, not shown, for attracting rodents and that the parts are in their positions of Figure 2, a rodent, not shown, attracted by the bait will enter the entrapment chamber 48 through the entrance openings 36 and 52 and will step upon the treadle 71 in an effort to reach the bait. When this occurs, the treadle 71 will be swung downwardly on its pivot 73 to its dotted line position of Figure 4 thereby causing the treadle bar 75 to swing upwardly. The free end of the treadle bar 75 will carry the free end 83 of the latch bar 79 upwardly until the portion 83 strikes the stop 77 at which time the bar portions 75 and 79 will be in their dotted line positions of Figure 4. This clockwise rocking movement of the latch bar 78 will cause the bar portion 80 to swing to its dotted line position of Figure 4 out of engagement with the keeper portion 70. As the latch portion 80 by engagement with the keeper 70 supports the entrapment chamber 48 in its full line position of Figure 2 when the weight of a rodent is being borne by the entrapment chamber, said entrapment chamber will swing downwardly about the shaft 46 as a pivot when the latch bar portion 80 disengages the stationary keeper portion 70. This downward rocking movement of the entrapment chamber will be stopped by its floor 49 coming to rest upon the shield portion 84. In this position the entrance opening 52 will be out of registry with the opening 36 and in registry with the opening 88 and as the housing opening 36 will then be closed by the wall 51, the only escape for the rodent from the chamber 48 is through the opening 88 into the bottom section or container 11. As soon as the rodent leaps into the container 11 the counterweight 64 will cause the shaft 46 to rock in the opposite direction or counterclockwise, as seen in Figures 2 and 4, to return the entrapment chamber 48 to its full line position of Figure 2 with the apron 89 then closing the opening 88. When the entrapment chamber 48 is returned to its full line position of Figure 2, the weight of the latch bar portion 79 will cause the latch bar 78 to swing counterclockwise back to its full line position of Figure 4 so that the free end of the latch portion 80 will then engage on the keeper portion 70 to positively retain the entrapment chamber 48 in its full line position of Figure 2 until the latch bar 78 is again released, as previously described. The latch bar portion 79, 83 is also sufficiently heavy to swing the treadle 71 back to its full line position of Figure 4 by the end 83 bearing upon the free end portion of the treadle bar 75.

It will thus be readily apparent that the trap 10 will automatically reset itself after entrapping a rodent in the container section 11 so that any number of rodents may be trapped in a live condition before the container section 11 is emptied of the rodent by removing or opening the closure 19 to expose the exit opening 18.

The trap 10 may be made in various sizes for accommodating rodents of different sizes. For traps of relatively small size a tool having a hooked end, not shown, may engage the eye of the handle 90 of the bait container 54 to open said bait container sufficiently so that a bait can be inserted through its open side and the bait container thereafter pushed back to a closed position. Such tool may be inserted through the opening 52 with the housing section 25 in either an open or a closed position. For larger traps, the hand may be inserted through the opening 52 to manually open and close the bait container 54 and to apply the bait thereto.

Various modifications and changes are contemplated and may obviously be resorted to, without departing from the spirit or scope of the invention as hereinafter defined by the appended claims.

I claim as my invention:

1. In an automatic resetting rodent trap, the combination with a bottom section defining a cage for entrapped rodents having a top wall provided with an elongated opening, transversely aligned bearings supported on the top wall and journalling a cross shaft, a balance beam secured intermediate of its ends to the cross shaft and having a counterweight at one end thereof, of an entrapment chamber fixed to the opposite end of the balance beam and normally supported by the counterweight in an elevated position above the opening in the top wall of the cage, said entrapment chamber having a floor disposed substantially in the same plane as the cage top wall and in the opening thereof when the entrapment chamber is disposed in an elevated position, said entrapment chamber having an outer front wall disposed remote to the balance beam provided with a restricted entrance opening therein extending upwardly from the floor and terminating adjacent thereto through which a rodent is adapted to enter the entrapment chamber in the elevated position thereof, said entrapment chamber having a rear wall provided with an opening, a stationary latch keeper secured to the top wall of the cage and extending into the entrapment chamber through said rear wall opening, said latch keeper having a laterally extending portion disposed in the entrapment chamber, a latch bar supported by the entrapment chamber and pivotally connected thereto adjacent said rear wall opening and above the laterally extending latch keeper portion and between said portion and said rear wall, said latch bar having a downwardly extending end normally resting on said laterally extending latch keeper portion for latching the entrapment chamber in an elevated open position, a treadle pivotally connected to and mounted for vertical swinging movement in the entrapment chamber above and forwardly of the laterally extending latch keeper portion and having a latch operating bar extending therefrom through the rear wall opening, said latch operating bar being disposed on the opposite side of the treadle pivot to said treadle and being laterally offset relatively to said latch keeper and to said downwardly extending end of the latch bar, said latch bar having an opposite longer and heavier end extending from the latch bar pivot through the rear wall opening and provided with a laterally offset terminal portion resting on said latch actuating bar and supporting the downwardly extending latch bar end in a position to rest on said laterally extending latch keeper portion when the treadle is maintained in a raised position by the weight of said opposite latch bar end and the latch actuating bar, said treadle being adapted to be engaged and swung downwardly by a rodent for rocking said latch actuating bar and said opposite end of the latch bar upwardly to swing the first mentioned end of the latch bar downwardly and rearwardly out of engagement with the said laterally extending latch keeper portion whereby the weight of the rodent will swing the entrapment chamber and the end of the balance beam connected thereto downwardly to move said entrance opening into registry with the cage whereby the rodent may escape through the entrance opening only into the cage, said counterweight returning the entrapment chamber to an elevated position after the weight of a rodent is removed therefrom, and said latch bar and treadle being returned to reset positions by the weight of said opposite end of the latch bar for relatching the entrapment chamber in an elevated set position, said downwardly extending latch bar end being swingable rearwardly by engagement with the laterally extending latch keeper portion to permit said latch bar end to return to a reset position thereon after moving upwardly past said laterally extending latch keeper portion.

2. In an automatic resetting rodent trap, the combination with an elongated bottom compartment forming a cage having a top wall provided with an elongated opening, of an entrapment chamber pivotally mounted on the top wall of the cage for swinging movement vertically through said opening, counterbalance means connected to and supporting the entrapment chamber in an elevated position above the cage and in substantially a horizontal plane, said entrapment chamber having a rear wall disposed adjacent the pivot thereof and having an opening therein, a stationary keeper secured to the top wall of the cage and extending through said rear wall opening into the entrapment chamber, said keeper having a laterally extending portion disposed in the entrapment chamber, a latch supported by and pivotally mounted in the entrapment chamber and normally maintained by gravity with a first end thereof in engagement on said laterally extending keeper portion to latch the entrapment chamber in an elevated open position, said first end of the latch extending downwardly and forwardly from the latch pivot, said latch having a second heavier counterbalancing end extending through the rear wall opening, a treadle supported by and pivotally mounted in the entrapment chamber and normally maintained by gravity in a raised set position, said laterally extending keeper portion being disposed substantially below and forwardly of the latch pivot and slightly below and to the rear of the treadle pivot, a treadle bar projecting from the pivoted end of the treadle through the rear wall opening and engaging under a laterally offset part of said second end of the latch for rocking the latch to a released position when the treadle is swung downwardly, said treadle bar being offset laterally from the remainder of the latch and from the keeper, and said latch being laterally offset from all portions of the keeper except the laterally extending end thereof, the weight of the second latch end normally supporting the treadle in an elevated set position and the first mentioned latch end in a position to engage on said laterally extending keeper portion, and said entrapment chamber having an outer end wall provided with an opening normally disposed above said bottom compartment when the entrapment chamber is in an elevated position, whereby on actuation of the treadle the latch is released and the entrapment chamber is swung downwardly by the weight of a rodent therein, said counterbalance means normally returning the entrapment chamber to an elevated set position after the rodent has escaped from the entrapment chamber through the outer end wall opening into the cage.

3. A trap as in claim 2, and a combination stop and guide means loosely engaging portions of the second latch end and treadle bar and having a part disposed thereabove and cooperating with a part of the counterbalance means disposed therebeneath for limiting rocking movement of the latch and treadle and for restricting upward swinging movement of the first latch end to a position to engage on the laterally offset keeper portion.

References Cited in the file of this patent

UNITED STATES PATENTS

| Number | Name | Date |
| --- | --- | --- |
| 803,629 | Schultz | Nov. 7, 1905 |
| 1,002,273 | Indahl | Sept. 5, 1911 |
| 1,901,210 | Vickers | Mar. 14, 1933 |
| 2,056,882 | Appiani | Oct. 6, 1936 |
| 2,160,986 | Rafferty et al. | June 6, 1939 |
| 2,463,839 | Wilson | Mar. 8, 1949 |